United States Patent
Cortes

(10) Patent No.: US 11,365,532 B2
(45) Date of Patent: Jun. 21, 2022

(54) AUTOMATED DEVICE FOR SAVING SHOWER WATER

(71) Applicant: Jorge Eduardo Cortes, Bogota (CO)

(72) Inventor: Jorge Eduardo Cortes, Bogota (CO)

(*) Notice: Subject to any disclaimer, the term of this patent is extended or adjusted under 35 U.S.C. 154(b) by 52 days.

(21) Appl. No.: 16/499,846

(22) PCT Filed: Mar. 31, 2018

(86) PCT No.: PCT/IB2018/052244
§ 371 (c)(1),
(2) Date: Sep. 30, 2019

(87) PCT Pub. No.: WO2018/178954
PCT Pub. Date: Oct. 4, 2018

(65) Prior Publication Data
US 2020/0024836 A1    Jan. 23, 2020

(30) Foreign Application Priority Data
Mar. 31, 2017   (CO) .......................... NC2017/0003237

(51) Int. Cl.
*E03C 1/04* (2006.01)
*E03B 1/04* (2006.01)
*G05B 11/01* (2006.01)

(52) U.S. Cl.
CPC ............ *E03C 1/0408* (2013.01); *E03B 1/041* (2013.01); *G05B 11/01* (2013.01); *E03B 2001/045* (2013.01)

(58) Field of Classification Search
CPC ..................................................... E03C 1/0408
USPC .......................................................... 4/665
See application file for complete search history.

(56) References Cited

U.S. PATENT DOCUMENTS

| | | | | | |
|---|---|---|---|---|---|
| 5,106,493 | A | * | 4/1992 | McIntosh | E03B 1/04 210/100 |
| 6,286,764 | B1 | * | 9/2001 | Garvey | G05D 27/02 236/12.12 |
| 2011/0289672 | A1 | * | 12/2011 | Cummings | E03B 1/048 4/603 |
| 2014/0076415 | A1 | * | 3/2014 | Dunki-Jacobs | F16K 3/08 137/78.1 |
| 2015/0000025 | A1 | * | 1/2015 | Clements | G06F 3/0482 4/443 |

* cited by examiner

*Primary Examiner* — Lauren A Crane
(74) *Attorney, Agent, or Firm* — Duane Morris LLP; Gregory M. Lefkowitz; Randall C. Pyles

(57) ABSTRACT

The invention relates to a water-saving device which is fully automated and comprises a complete electronic control system, the possibility of connection to the aqueduct supply network and a hydraulic generator for saving energy. The device according to the invention communicates with a modular system that optionally reduces the water flow of the shower to 50% and diverts the other 50% to the storage tank, by means of the electronic interface. The device according to the invention is applicable in the construction industry.

5 Claims, 24 Drawing Sheets

AUTOMATED DEVICE FOR SAVING SHOWER WATER

FIELD OF THE INVENTION

The present invention relates to mechanical and environmental engineering, specifically to the field of architecture and construction. The present invention is particularly related to the design of electro mechanic and electronic devices for water saving, more specifically with the development of these devices for domestic plumbing installations.

The present invention corresponds to the development of an automated device for water saving in showers and toilets that comprises an integrated and functional system.

PRIOR ART

Water saving is currently one of the factors of major interest and awareness in the world. Bathrooms are one of the main water consumption sources in households due to the amount of sanitary equipment that is used, such as showerheads, toilets and handwashers. Thus, a variety of devices for consumption reduction have been developed.

Patent CO16028099 reveals a system associated with a gathering, storage, conduction and usage of the potable water in the shower for diverse ends, installed in new or existing households. The existing version of the system allows the cold water to be sent via gravity to a storage tank, by two manual two-way valves and one manual three-way valve. The system is totally manual and not automatized. It requires manual measurements for variables such as temperature. By being a fully manual system, the user needs to dispose the saved water manually since it is not re-introduced into the water supply network nor the toilet tank and thus, does not integrate electronic controllers, temperature sensor, electronic valve, energy micro-generator, rechargeable battery, wireless communication module, or electronic interface, which impedes the reduction of 50% of water flow coming from the shower and direct the remaining 50% of the water to the storage tank in an automated way, like the present invention does.

In the same way, patent CN204373226 describes a utility model for a fully manual domestic device for water saving in the shower, which comprises two water collecting tanks, a gas water heater and a showerhead. However, like the previous system, it does not have an electronic valve, a temperature sensor, a rechargeable battery, an energy micro generator, nor an electronic control interface that allows the system to measure variables automatically and divert the flow of water in two different directions. In neither case a venturi device, nor a lateral entry level valve, are used for water re-utilization.

There are other systems with storage tanks that comprise a water saving system along with hydraulic deviation device capable of sending the water in 2 directions from the water inlet of the watercourse supply, like in the granted patent U.S. Pat. No. 7,490,373 that discloses a water saving system for showers, which comprises a manual deviation device that defines two water flow trajectories coming from the conventional plumbing, a deposit to store water, a venturi device between the deviation device and the showerhead output. The venturi device, in connection to a line, allows the water contained in the tank to re-enter the conventional plumbing so that it is discharged towards the showerhead output. However, the venturi's sucks the water from the tank so that it re-enters the shower without the possibility of connection to the toilet or the watercourse supply network. The described system does not comprise a wireless connection module, rechargeable battery, nor electronic valves, or any kind of electronic controllers and interfaces, therefore it does not measure the water temperature at any moment for it does not have sensors to do so. It simply diverts water to a tank, and when the tank is full an alarm warns the user, so he/she diverts the water manually to the shower head. In the same way, the utility model patent CN204181532 provides an automatic water saving device consisting of a five positions 5-way valve with electromagnetic characteristics and a water storage tank, in which it is possible to detect the water temperature through a thermal sensor. Likewise, it comprises a backflow valve. However, the disclosed device does not have a system that allows the connection to the toilet or the water supply network in order to re-use the water that is stored in the tank, besides, the tank has a piston system to fill and empty itself, which does not take advantage of gravity nor it uses a venturi device to re-introduce water. The device does not use an energy micro-generator, rechargeable battery, wireless connection module, or an electronic interface and therefore it does not have the option to reduce shower water flow in half by sending the remaining water flow to the tank.

It is not common to find devices and/or water saving systems with any kind of electronic operation, although there are cases like patent CN205745606 where a smart shower is presented which includes a hot water storage tank, solenoid valve, temperature sensor, water flow sensor, microprocessor and control panel. The solenoid valve adjusts the water flow and is installed in both the hot and cold-water pipes, it includes casing, temperature and water flow sensors in the mixed water cavity. The showerhead has a microprocessor that controls the inlet of solar energy heated water and water stored in the tank, according to the received temperature information. This smart shower includes one-way valves that regulate water flow but do not divert it, and although it includes an electronic control device, this controller does not have a rechargeable battery in case there is a power outage, nor a wireless connection module for internet connection. Contrary to the present invention, this patent is not adaptable for already built households and it requires its own solar heater, furthermore it proposes a smart control of the water temperature during the shower but it does not save the initial cold water, nor it allows the user to re-direct the water flow from the shower to a tank at any given moment, so it does not mention any method of water re-introduction. Another water saving device like the one disclosed in patent US2009165875 finds its main use in a water supply system and comprises a water storage chamber, a water flow sensor to determine if water flows in the hot water duct, a temperature sensor to determine water temperature, water flow direction means, and a control device. It also includes an electronic device to control the flow and temperature sensor signals; the water in the storage tank is available for the water supply network. Unlike the present invention, the device shown in this patent does not include a hydraulic micro-generator for energetic savings nor it uses a rechargeable battery or a wireless connection module for the system to connect to the internet. It does not give the user the option to divert 50% of the water flow to the storage tank in order to reduce water consumption in the shower. As for the valves, this water saving device works with two-way valves, not three-way valves like the present invention, nor it uses a lateral inlet level valve to re utilize saved water in the toilet. Finally, the turning-on process in the device starts due to a flow sensor and not by means of a power button/switch/encoder.

Unlike the discussed devices in the prior art, the automated water saving device from the present invention is fully automated and comprises an electronic control device with which the user interacts, a wireless connection module that connects the system to the internet, a hydraulic micro-generator to save electrical energy, and the possibility to connect to the toilet or the water supply network for the autonomous reuse of saved water. Likewise, being a modular system, it allows the builder or the household owner to choose the location of the system's tank and piping and/or hoses, according to preference. Furthermore, it gives the user the option to reduce shower water flow by 50% and divert the remaining 50% to the storage tank, via the electronic interface.

DESCRIPTION OF THE INVENTION

The automated shower water saving device of the present invention combines a hydraulic routing, energy generation and flow measurement electro-mechanic integrated system (1), a modular water storage system (7), an electronic control interface with wireless internet connection (11) and an autonomous water reuse system (20) in one integrated and functional unit. (FIG. 1-FIG. 2).

The invention completes an automated saving of water as it reaches a temperature determined by a user, or when this user indicates so in an electronic interface (11). This interface comprises a screen (12), a power button and/or switch and/or encoder, one or a group of buttons and/or switches and/or encoders for water temperature and routing control (13), a rechargeable battery (15) and/or AC/DC converter (16), a microcontroller (17) and a charge/use controller (18). Said interface displays information about shower time, water temperature and consumption, in real time. It also comprises a wireless connection module (14) which connects the system to the internet, supplies relevant information about water consumption in the shower, and allows remote control of the system. (FIG. 9-FIG. 9A-FIG. 9B).

In the device of the present invention, the hydraulic routing, energy generation and flow measurement system (1) is composed of a three-way electronic valve (6) horizontally or vertically connected to the hydraulic micro generator (5), a temperature sensor (4), a flowmeter (3) and a removable filter (2) at the entrance of the system. (FIG. 7-FIG. 8).

According to this aspect of the invention, the modular series of tanks (7) comprises between 1 to 5 modular water storage tanks per shower, which can be internal, external or recessed in the wall. (FIG. 3-FIG. 4). These tanks comprise between 1 to 5 reliefs (8), between 0 and 5 mechanical shut-off valves (9), between 0 and at least 1 backflow valve (22) and at least 1 removable filter (10). (FIG. 20).

Likewise, the device of the invention counts with an autonomous water reuse system (20), reintroducing it independently into the toilet water tank or the housing water supply network. For the reuse of water in the toilet, said system is composed by a lateral entry level valve (23) which connects directly to the toilet tank (FIG. 22). For the water reintroduction into the supply network, the system is composed by a Venturi tube (21) and between 0 and at least one unidirectional or backflow valve (22). (FIG. 21).

The stored water in the modular series of tanks (7) is driven to the autonomous water reuse point through gravity.

DETAILED DESCRIPTION

Figure 1:
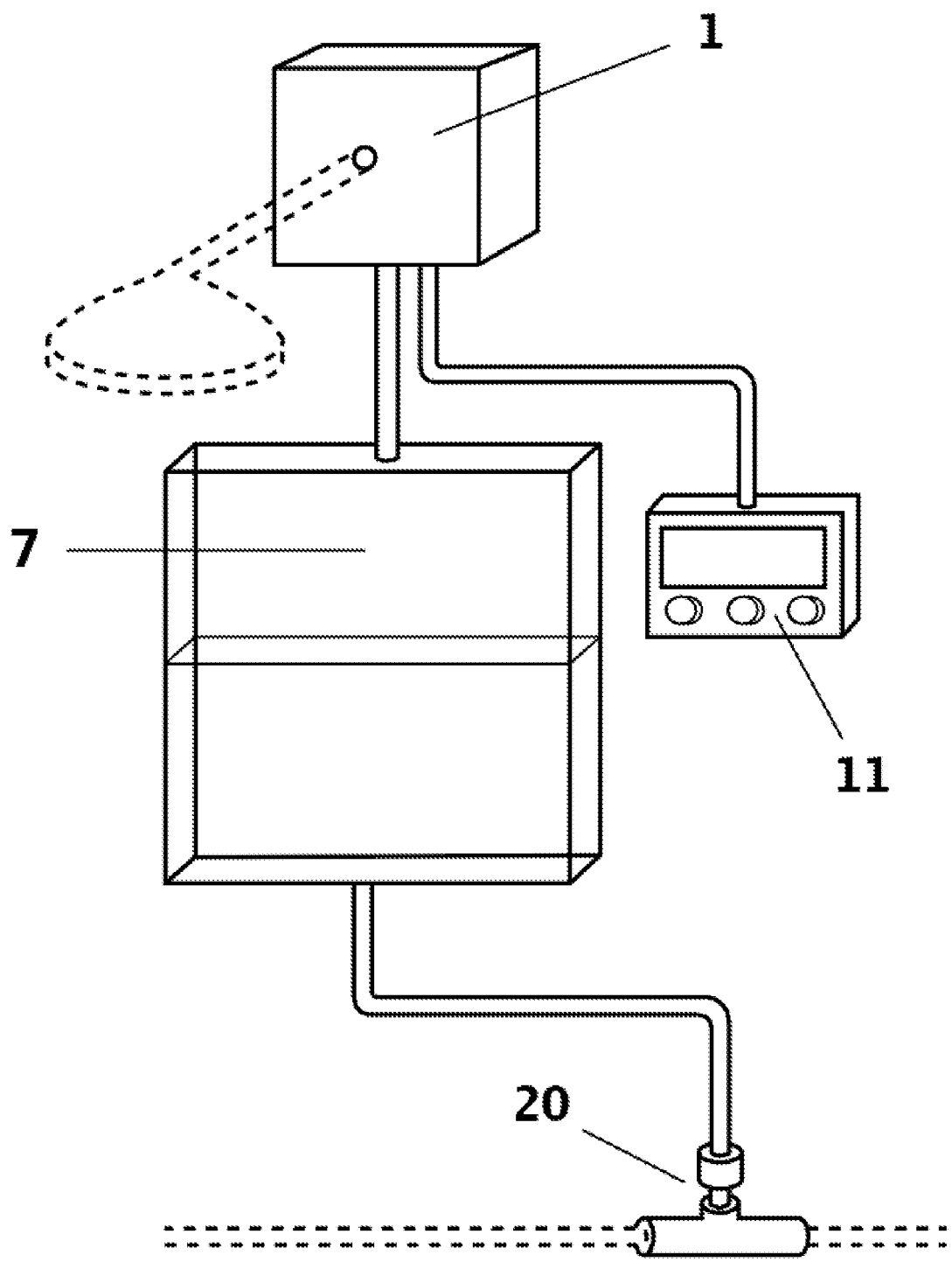
FIG. 1. General outline of the device of the present invention. Autonomous water reuse system (20) for any point of the household, with only one storage tank (7).
Figure 2:
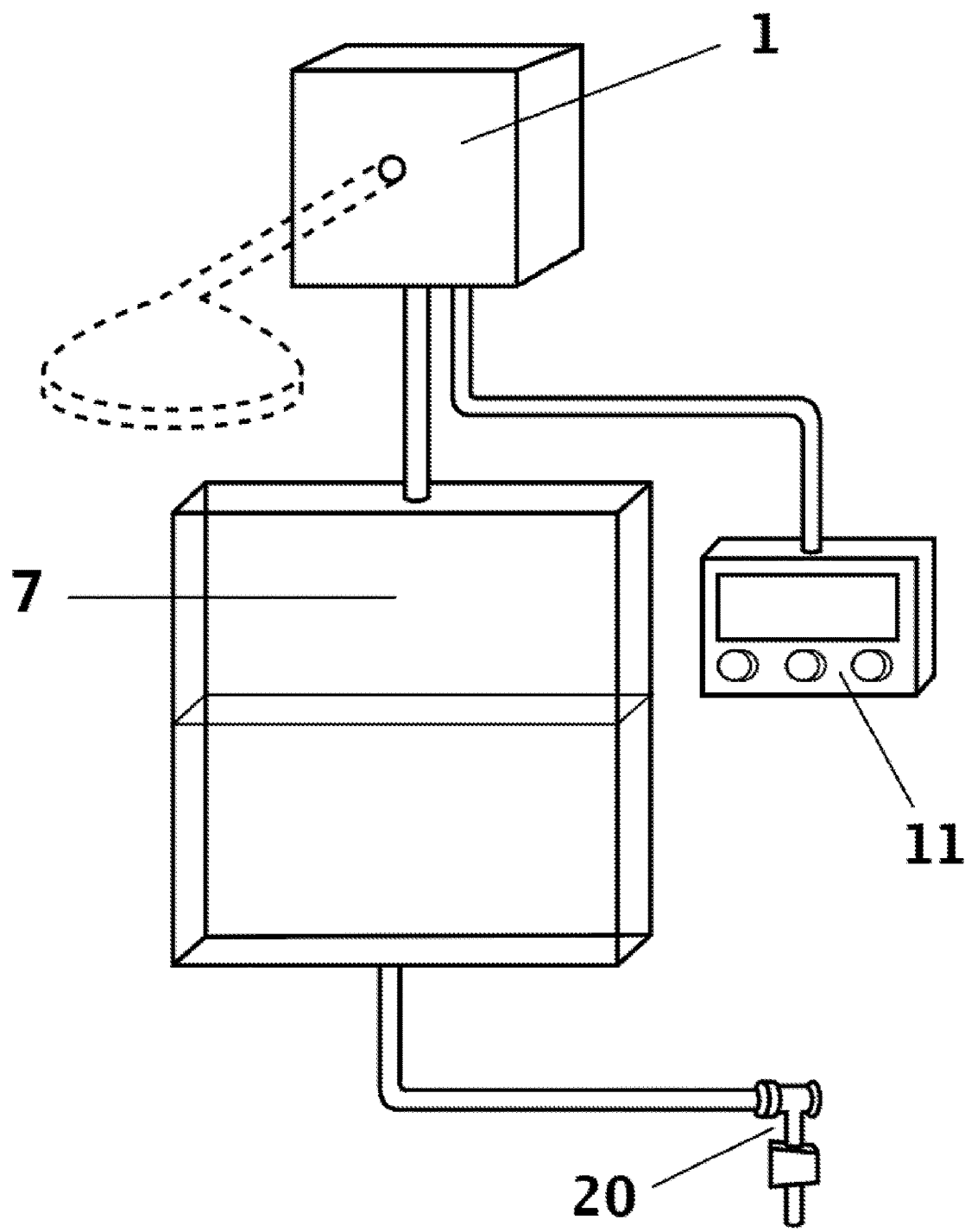
FIG. 2. General outline of the device of the present invention. Autonomous water reuse system (20) connected directly to the toilet tank, with only one storage tank (7).
Figure 3:
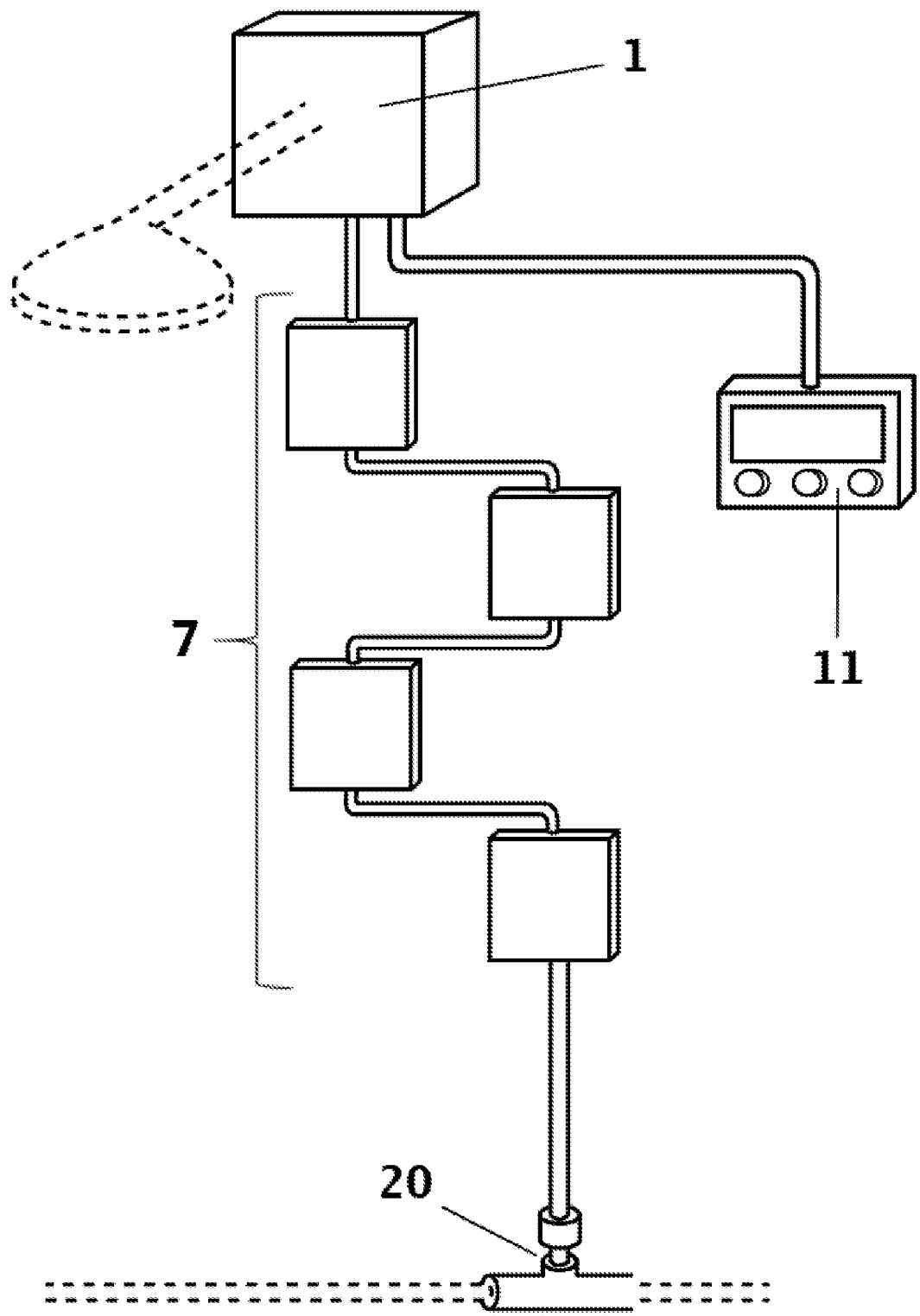
FIG. 3. General outline of the device of the present invention. Autonomous water reuse system (20) for any point of the household. The embodiment includes between 2 and 5 modular tanks connected in series (7).
Figure 4:
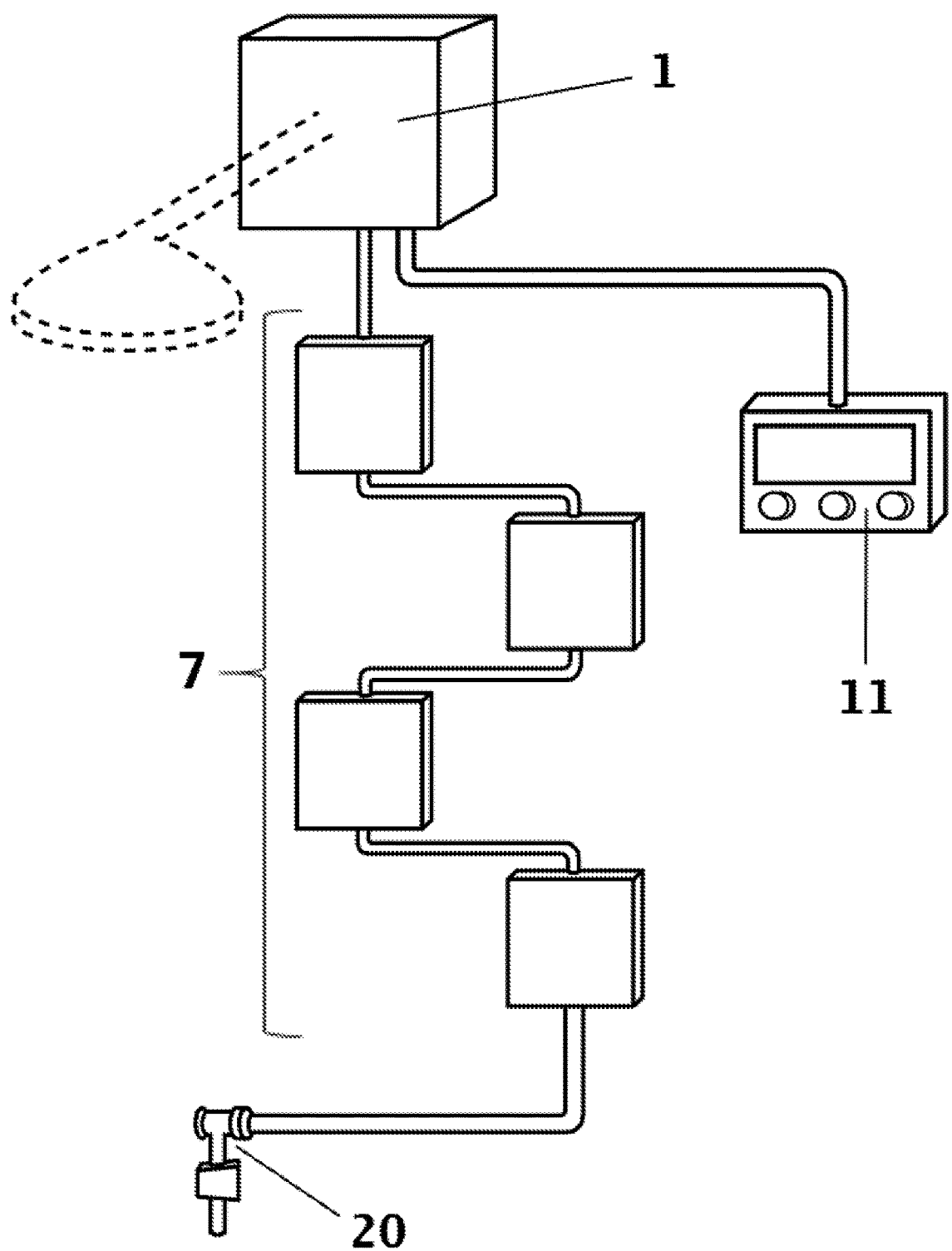
FIG. 4. General outline of the device of the present invention. Autonomous water reuse system (20) connected directly to the toilet tank. The embodiment includes between 2 and 5 modular tanks connected in series (7).

The automated shower water saving device of the present invention combines a hydraulic routing, energy generation and flow measurement electro-mechanic integrated system (1), a modular water storage system (7), an electronic control interface with wireless internet connection (11) and an autonomous water reuse system (20) in one integrated and functional unit.

The device of the present invention completes an automated water saving as it reaches a temperature determined by the user through the electronic control interface (11), or in any other moment through the actuation of the three-way electronic valve (6), the temperature sensor (4), the interface buttons and/or switches and/or encoders (13) and the micro-controller (17). This system redirects shower water and stores it in a series of partially modular tanks (7), for its later autonomous reuse in the housing water network or the toilet tank. Additionally, the device comprises a partial power supply system through a hydraulic micro-generator (5), connected to the water inlet, as well as a water flowmeter (3) and a wireless internet connection module (14) which allows the user to have a remote control of the system and access to relevant information regarding their water consumption in the showers. The system's components are energetically supplied by the hydraulic micro-generator (5) and the rechargeable battery (15), which can be or not be connected to the housing energy supply network, through the AC/DC converter (16).

In one aspect of the invention, the hydraulic routing, energy generation and flow measurement electro-mechanic system (1) comprises a three-way electronic valve (6) horizontally or vertically connected to a hydraulic micro generator (5), a temperature sensor (4), a flowmeter (3) and a removable filter (2) at the entrance of the system.

In this same aspect of the invention, the three-way electronic valve (6) allows the routing of the water flow coming from the housing aqueduct network piping, either to the user's shower head or the device's storage tank (7). This is done automatically, according to the user's indication through the electronic control interface (11).

The three-way electronic valve (6) can be actioned to an intermediate position which allows the passing of 50% of water flow to the shower head, and the other 50% to the storage tank (7), in such a way that 50% of user water consumption is reduced, without affecting the water pressure or the water flow that goes through the water heater, and thus preventing such from turning off. The electronic valve (6) connects with the micro-controller (17), which determines its position, which in turn receives information from the temperature sensor (4) and the interface buttons and/or switches and/or encoders for water temperature control and routing (13).

According to this aspect of the invention, the hydraulic micro-generator (5) generates energy for the partial self-supply and according to system energetic requirements. It connects electronically with the charge/use controller (18) which in turn links with the micro-controller (17). It connects physically with the three-way electronic valve (6), vertically or horizontally, according to the desired arrangement of the device.

In this same aspect of the invention, the temperature sensor (4) connects with the electronic control interface (11), senses the water temperature, sends a signal to the micro-controller (17) and activates the change in position of the three-way electronic valve (6).

In this same aspect of the invention, the flowmeter (3) calculates the shower's water consumption and determines water savings. It is positioned before the electronic valve (6), so that both variables can be measured. It links electronically with the micro-controller (17), which allows to transmit and visualize the information on the screen (12).

According to this aspect of the invention, the removable filter (2) is positioned at the entrance of the system.

Specifically, the removable filter (2) is positioned at the entrance of the hydraulic routing, energy generation and flow measurement electro-mechanic system (1), i.e., before the temperature sensor (4), the electronic valve (6), the micro-generator (5) and the flowmeter (3). Such filter (2) preserves the system free from particles that could alter the appropriate operation of hydraulic components; said filter (2) is of easy maintenance. Preferably, this filter (2) can have a diameter between 1.27 cm and 3.81 cm, so that pressure losses are minimized.

According to another aspect of the invention, the modular series of tanks (7) consists of between 1 and 5 storage tanks per shower, which can be internal, external, or recessed in the wall, and comprise between 1 to 5 reliefs (8), between 0 and 5 mechanical shut-off valves (9), between 0 and at least 1 unidirectional backflow valve (22) and at least 1 removable filter (10) coupled to the water outlet.

Particularly, the cumulated volume by the modular series of tanks (7) will be at least 15 liters, per shower. This volume, and therefore the size of the tanks, can change and adapt to the user's needs.

Figure 5:
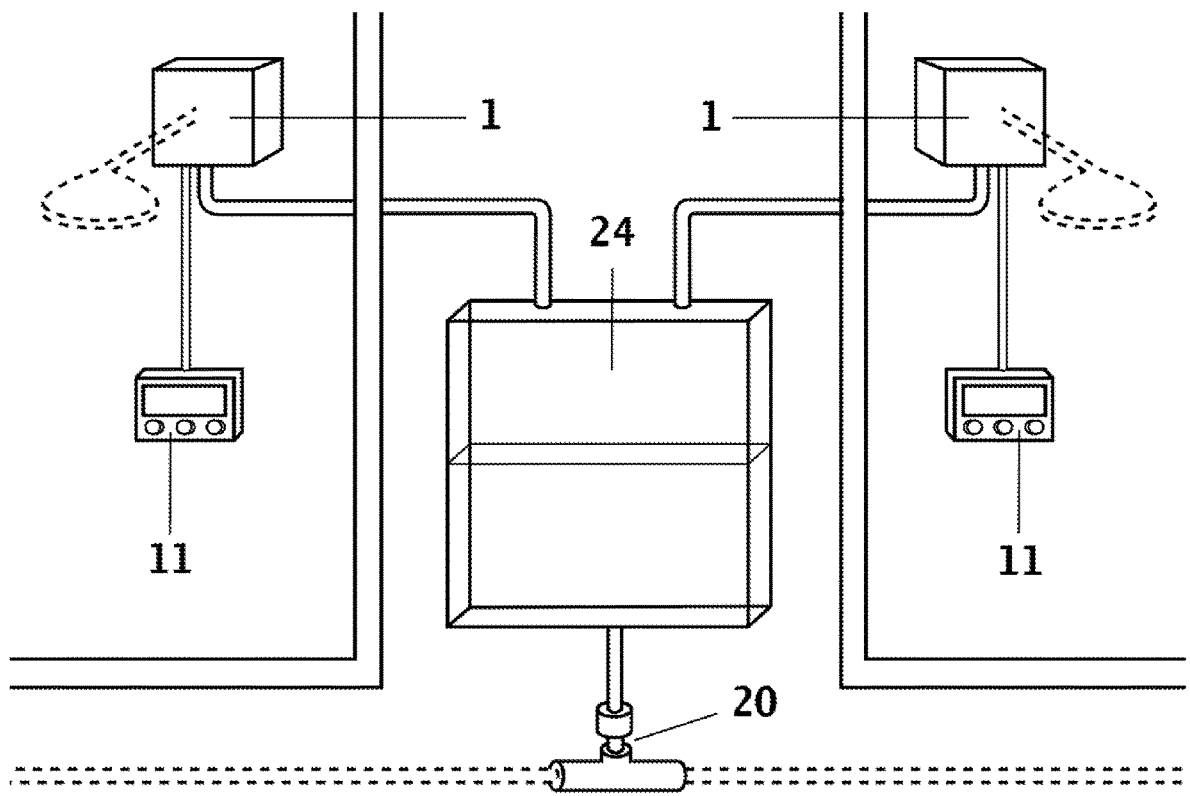
FIG. 5. General outline of the device of the present invention. Embodiment with a single central tank (24) for water storage from 2 or more showers. Autonomous water reuse system (20) for any point of the household.
Figure 6:
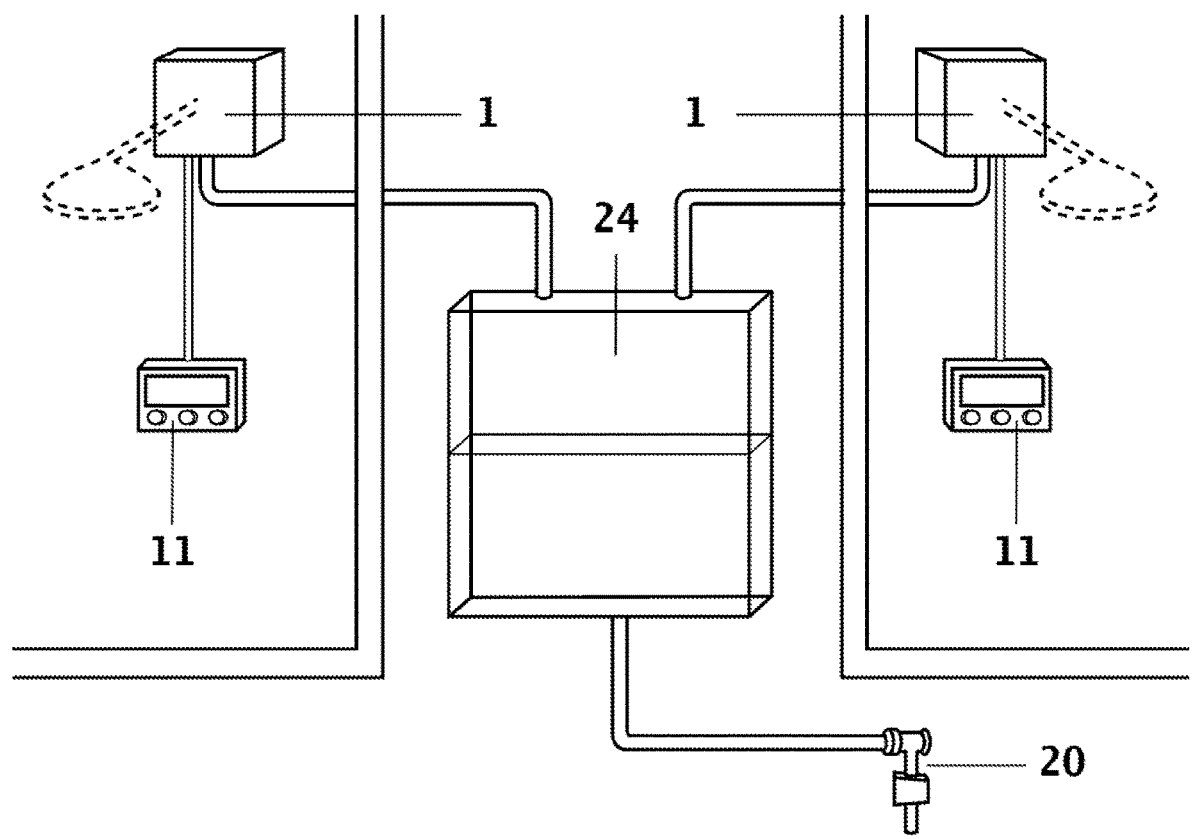
FIG. 6. General outline of the device of the present invention. Embodiment with a single central tank (24) for water storage from 2 or more showers. Autonomous water reuse system (20) connected directly to the toilet tank.
Figure 7:
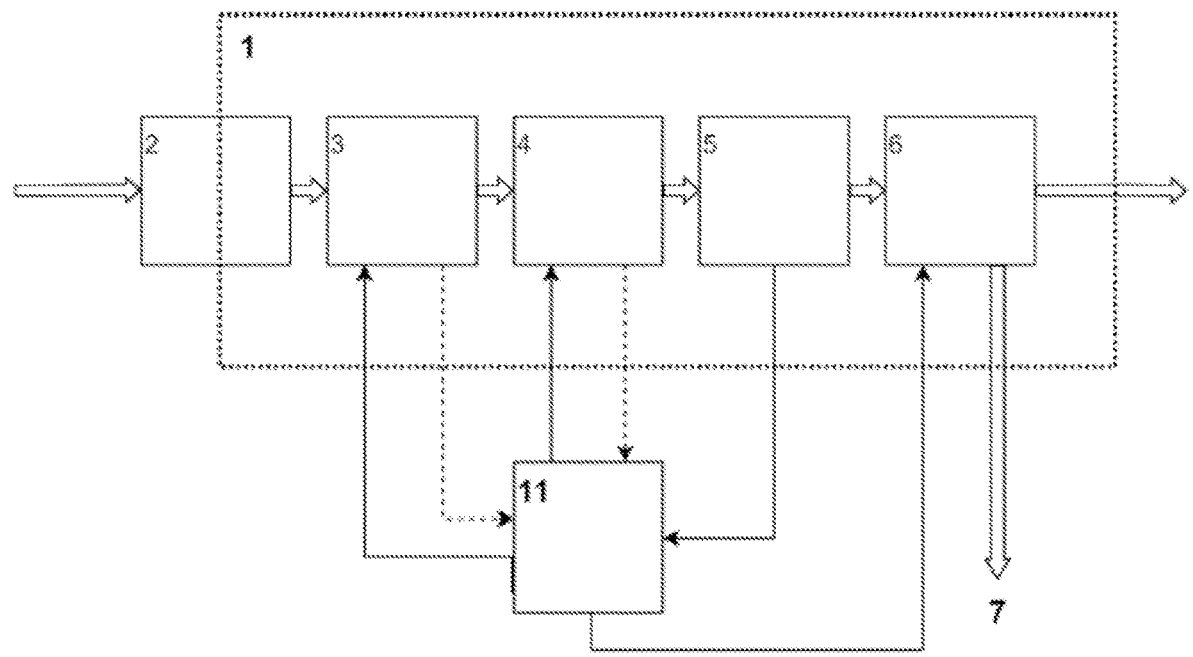
FIG. 7. General arrangement of the hydraulic routing, energy generation and flow measurement electro-mechanic system (1). 3-way electronic valve (6) horizontally connected with the hydraulic micro-generator (5).
Figure 8:
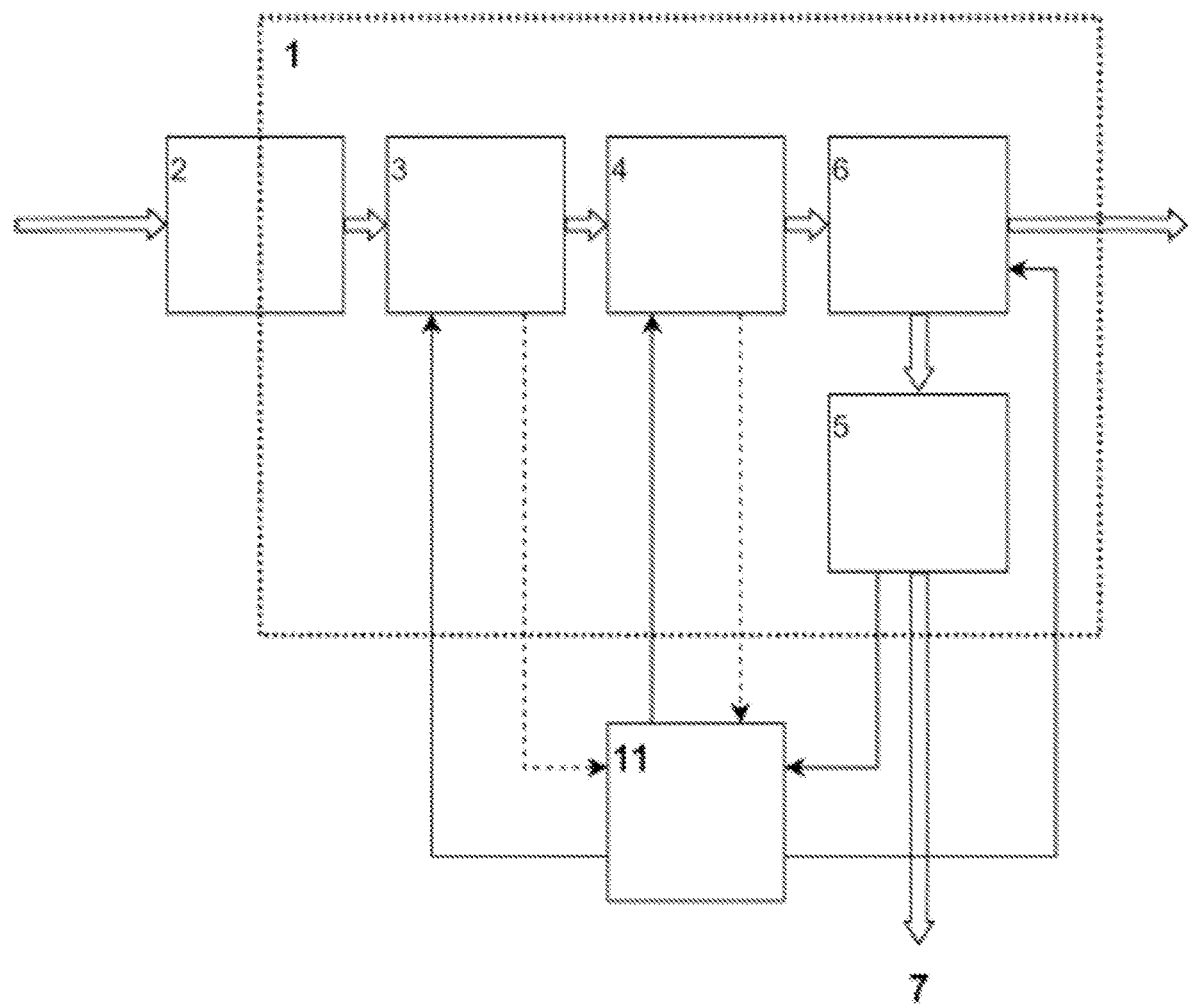
FIG. 8. General arrangement of the hydraulic routing, energy generation and flow measurement electro-mechanic system (1). 3-way electronic valve (6) vertically connected with the hydraulic micro-generator (5).
Figure 9:
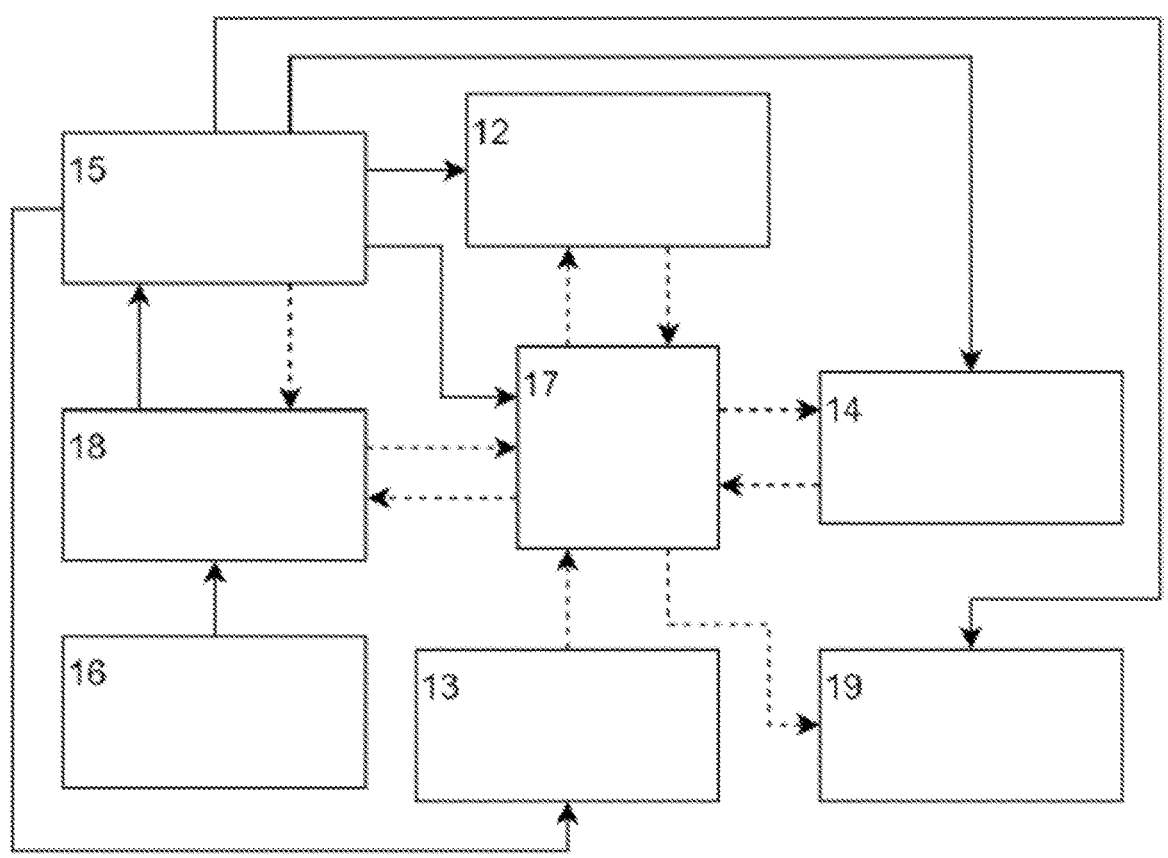
FIGS. 9, 9A, and B. General arrangement of the electronic control interface (11) in one of the embodiments of the invention.
Figure 9A:
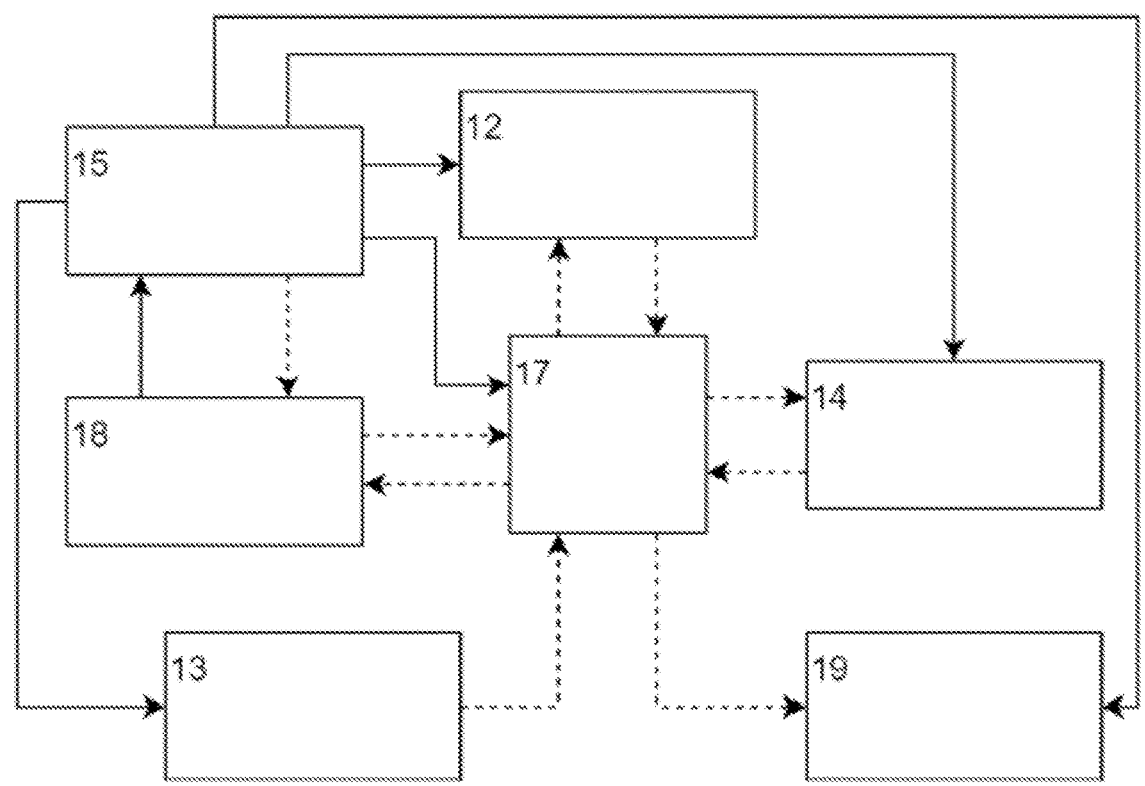
Figure 9B:
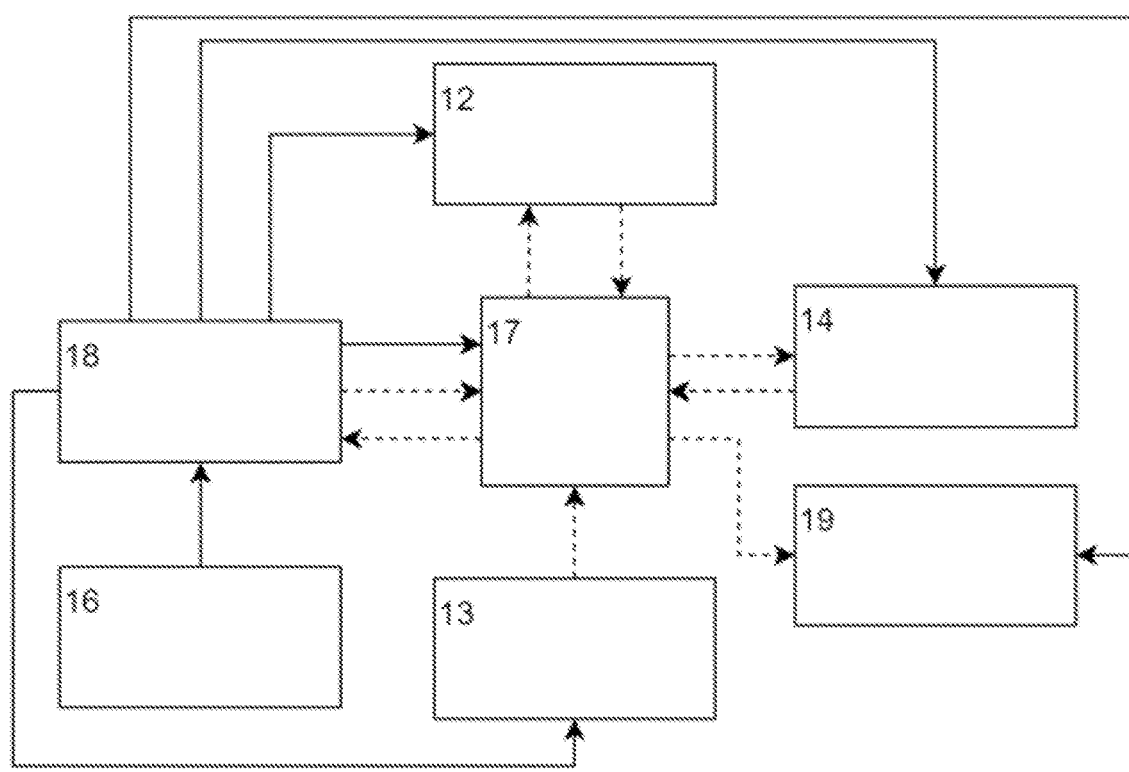

In the same particular aspect of the invention, the modular series of tanks (7) can relate to the water storage from one or several showers (FIG. 5-FIG. 6). More particularly, the modular series of tanks (7) can relate to a single central tank (24), which stores the gravity driven water from several showers. More particularly, the modular series of tanks (7) can relate to a series of between 1 and 5 tanks per shower, which in turn conduct water by gravity to a central storage tank (24).

More particularly, the modular series of tanks (7) are installed in an intermediate height between the hydraulic routing electro-mechanic system (1) and the toilet water tank, or the housing water reuse point, in order to conduct water by gravity. This conduction is performed by a hard or flexible piping system.

In this same aspect of the invention, the stored water in the modular series of tanks (7) is driven by gravity and reused through a system that is adapted to each shower and toilet, in built households, and the water supply network, in new households.

In another aspect of the invention, the electronic control interface (11) is comprised of a screen or display (12), a power button and/or switch and/or encoder; water temperature control and routing button(s) and/or switch(es) and/or encoder(s) (13); a wireless connection module (14); a rechargeable battery (15); a micro-controller (17); a charge/use controller (18); Particularly, said interface comprises an AC/DC converter for new housing (16).

In this same aspect of the invention, the electronic control interface (11) allows the user to fully control the operation of the system in a simple and automated way. Said electronic control interface (11) presents information about shower time, water temperature and water consumption, in real time. Besides, it comprises a wireless connection module (14) that connects the system to the internet, provides relevant information about water consumption in the shower, and allows remote control of the system.

Particularly, the user turns the system on with the power button/switch/encoder (13). The screen (12) turns on, where the user can view the items to be controlled with the system's buttons/switches/encoders (13).

In the same aspect of the invention, the user operates the buttons/switches/encoders (13) to select the temperature at which the user wants the device to allow water to come out of the shower head. Particularly, the invention's device is adaptable to any shower head available.

In this same aspect of the invention, the user opens the shower hot water tap, by using a single lever mixer, a double lever mixer, or any mixer the user has, and the cold water that used to come out before reaching its ideal temperature is led by the hydraulic routing system (1), which is controlled by the micro-controller (17), to the modular series of tanks (7). Water is sent to the modular series of tanks (7) until it reaches the temperature that was indicated by the user. The change in water temperature is indicated in the screen (12) in real time, so that the user can see when the hot water will come out.

Preferably, the electronic control interface (11) comprises a visual or auditory indicator (19) to alert the user that the water has reached its ideal temperature. Once the water reaches the indicated temperature, water comes out through the shower head, and the screen (12) shows real time information about water consumption, shower time and current water temperature, so that the user can have absolute control over his shower.

Still in this aspect of the invention, a button/switch/encoder (13) in the electronic control interface (11) is operated at user's discretion to direct 100% or 50% of the water flow to the storage tank (7) without altering the water pressure or water flow that runs through the water heater.

In the same aspect of the invention, the wireless connection module (14) connects the system to the internet, which allows the remote control of the system, the monitoring of each user's historic water consumption, and updates through a mobile application.

In this same aspect of the invention, all of the electronic components connect with the rechargeable battery (15) for its operation. Said rechargeable battery (15) can be connected to the energy supply network, by means of the charge/use controller (18) and the AC/DC converter (16).

In another aspect of the invention, the stored water autonomous reuse system (20) reintroduces water to the toilet or the housing's water supply network. For the reintroduction of water to the toilet, the system comprises a lateral entry level valve (23) which is connected to the toilet tank directly. On the other side, for the reintroduction of water to the supply network, the system comprises a venturi tube (21), and between 0 and at least one backflow valve (22). The system composed of a venturi tube (21) and between 0 and at least one unidirectional or backflow valve (22) is also adaptable to the line that supplies the toilet tank with water from the supply network.

The automated water saving device of the present invention, unlike those disclosed in the state of the art, is completely automated and comprises a complete electronic control interface (11) with which the user interacts, a wireless connection module (14) that connects the system to the internet, a hydraulic micro-generator (5) for energetic savings, and the possibility to connect to the toilet or the aqueduct supply network for the autonomous reuse of saved water. Likewise, being a modular system, it allows the builder or the household owner to choose the location of the system's tank and piping and/or lines, according to preferences.

In this same aspect of the invention, the automated shower water saving device is totally autonomous and adaptable.

Figure 10:
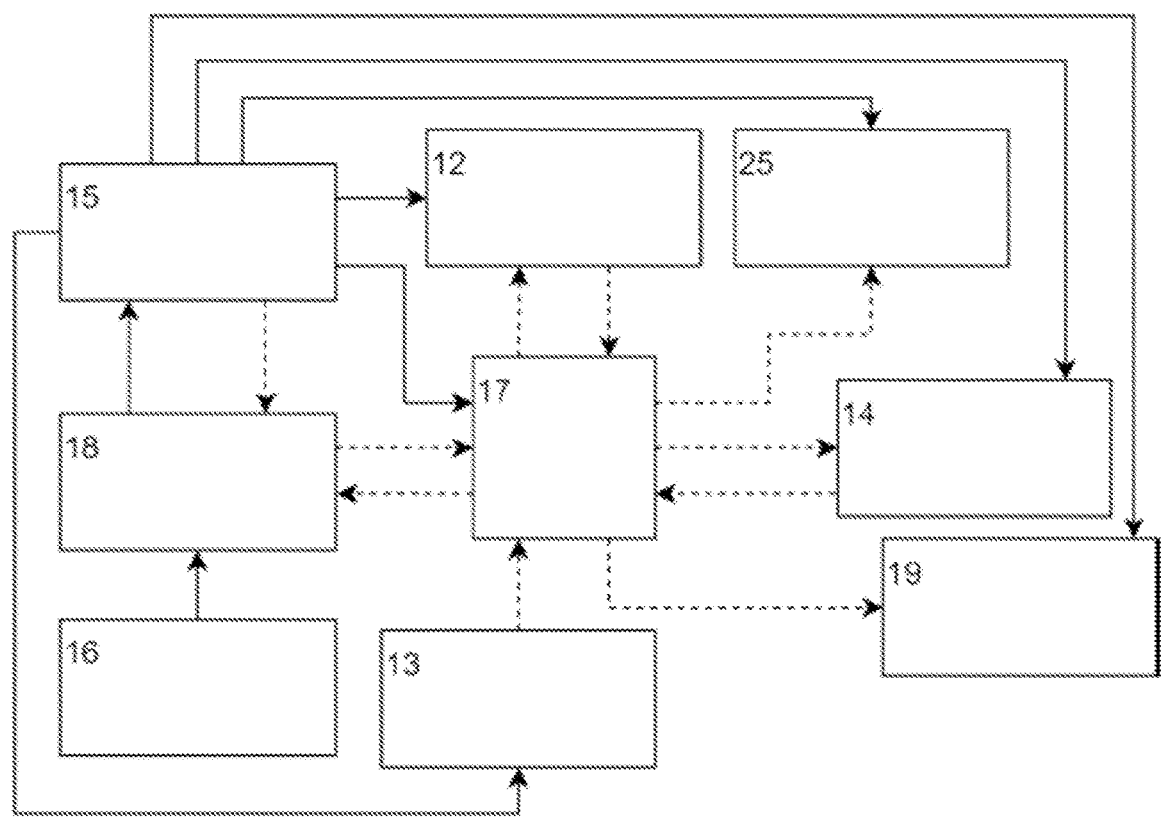
FIG. 10. General arrangement of the electronic control interface's components (11) in one of the embodiments of the invention.

According to this or another aspect of the invention, the device comprises a sound reproduction system (25) in the electronic control interface (11), which connects with the micro-controller (17) (FIG. 10).

Figure 11:
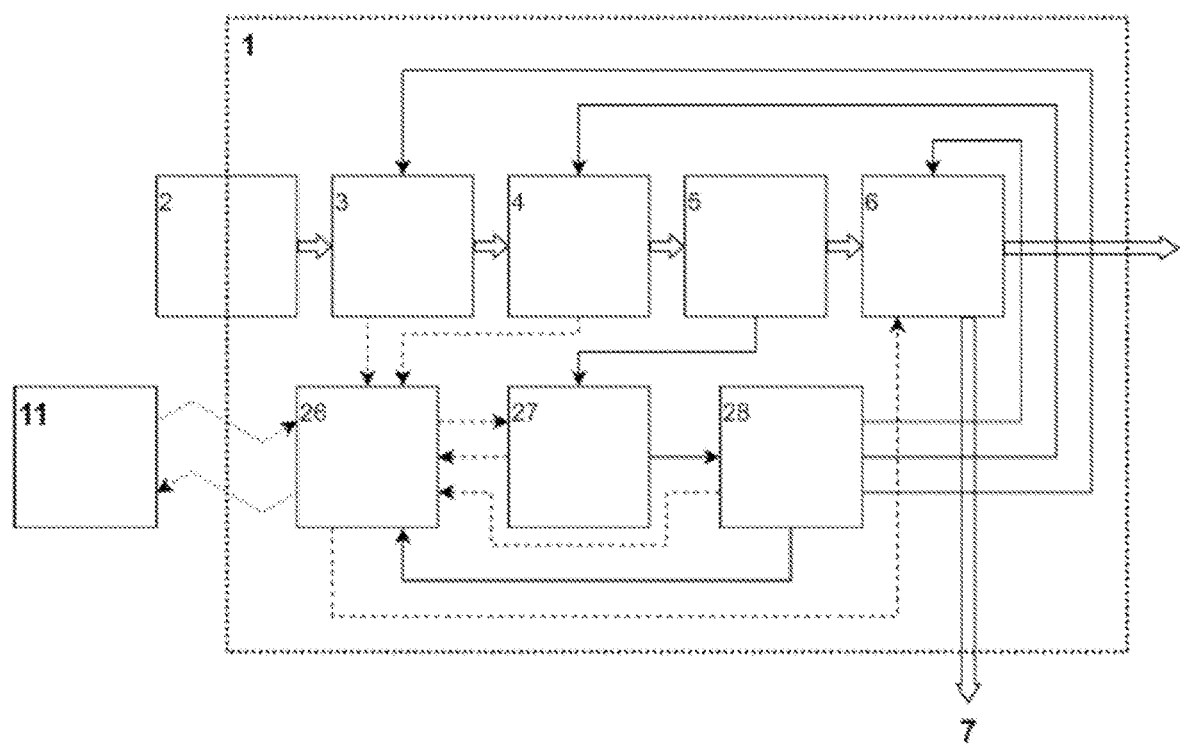
FIG. 11. General arrangement of the hydraulic routing, energy generation and flow measurement electro-mechanic system's components (1) in one of the embodiments of the invention.
Figure 12:
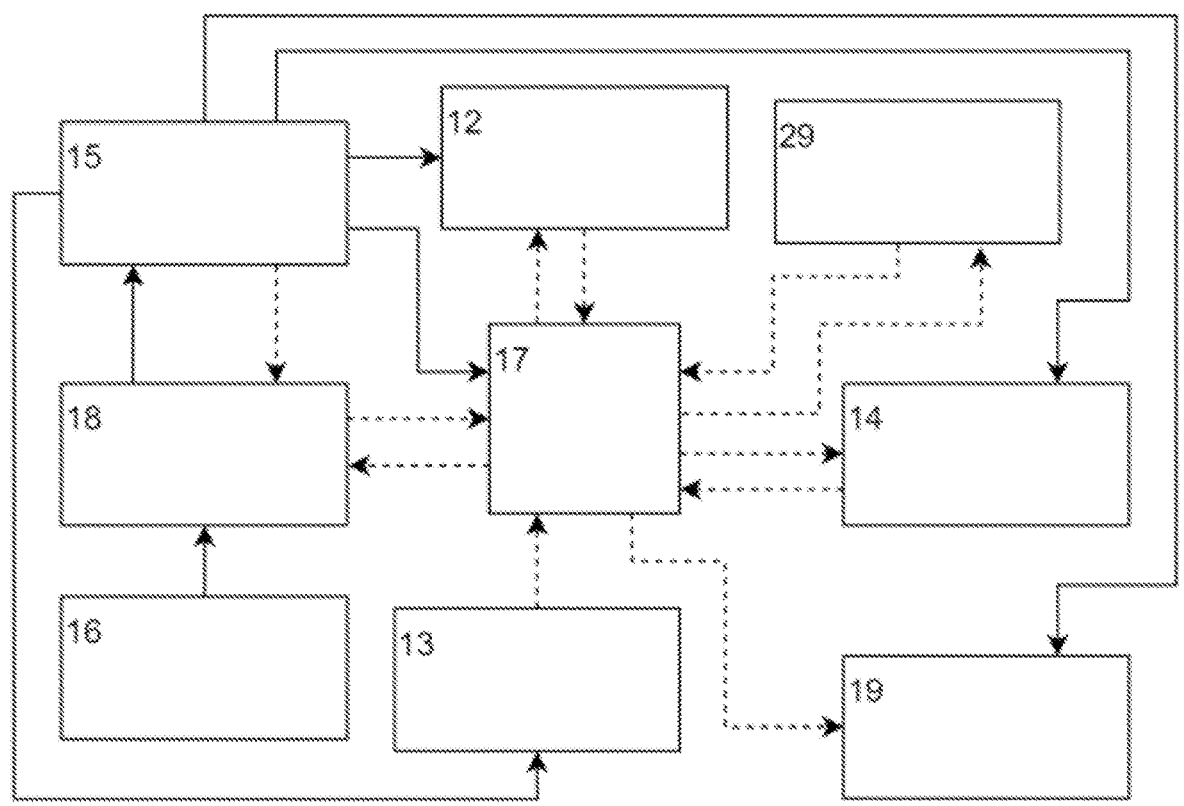
FIG. 12. General arrangement of the electronic control interface with wireless internet connection (11) in one of the embodiments of the invention.

In another particular aspect, the device of the invention includes a wireless transmitter/receiver (26), a second charge/use controller (27) and a second rechargeable battery (28), located in the device's hydraulic routing, energy generation and flow measurement electro-mechanic system (1), and connected with the flowmeter (3), the temperature sensor (4), the hydraulic micro-generator (5) and the 3-way electronic valve (6). It also includes a second wireless transmitter/receiver (29) located in the electronic control interface (11) and connected with the micro-controller (17). (FIG. 11-FIG. 12).

Figure 13:
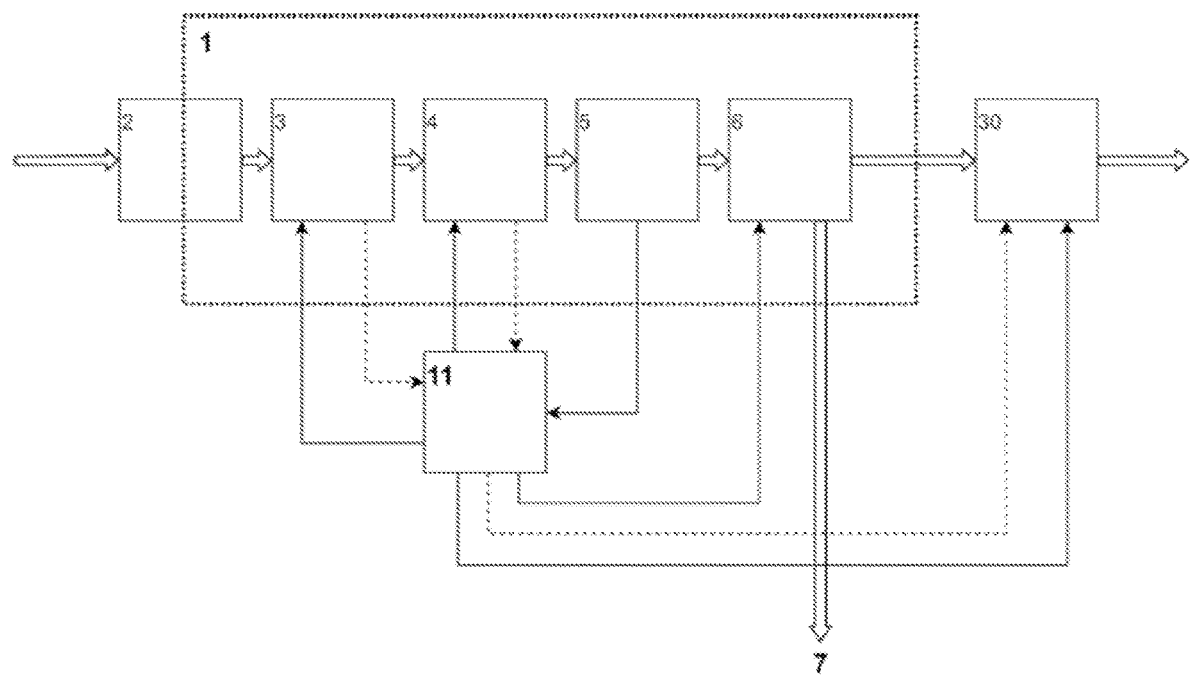
FIG. 13. General arrangement of the hydraulic routing, energy generation and flow measurement electro-mechanic system (1) in one of the embodiments of the invention.
Figure 14:
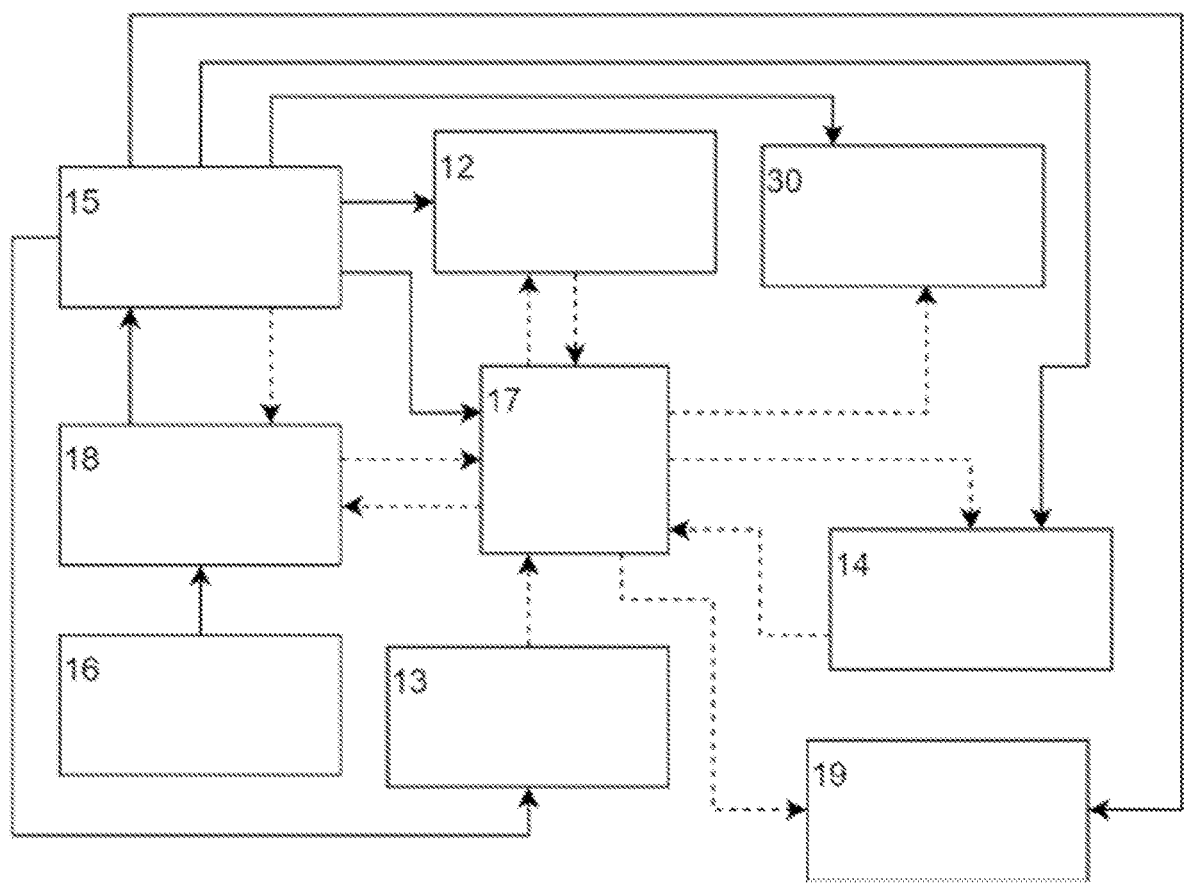
FIG. 14. General arrangement of the electronic control interface (11) in one of the embodiments of the invention.

More particularly in this aspect the device of the invention includes its own shower head, which comprises a servomotor (30), which connects with the micro-controller (17), and which allows the user to control the type of flow that comes out of the shower head, automatically. (FIG. 13-FIG. 14).

Figure 15:
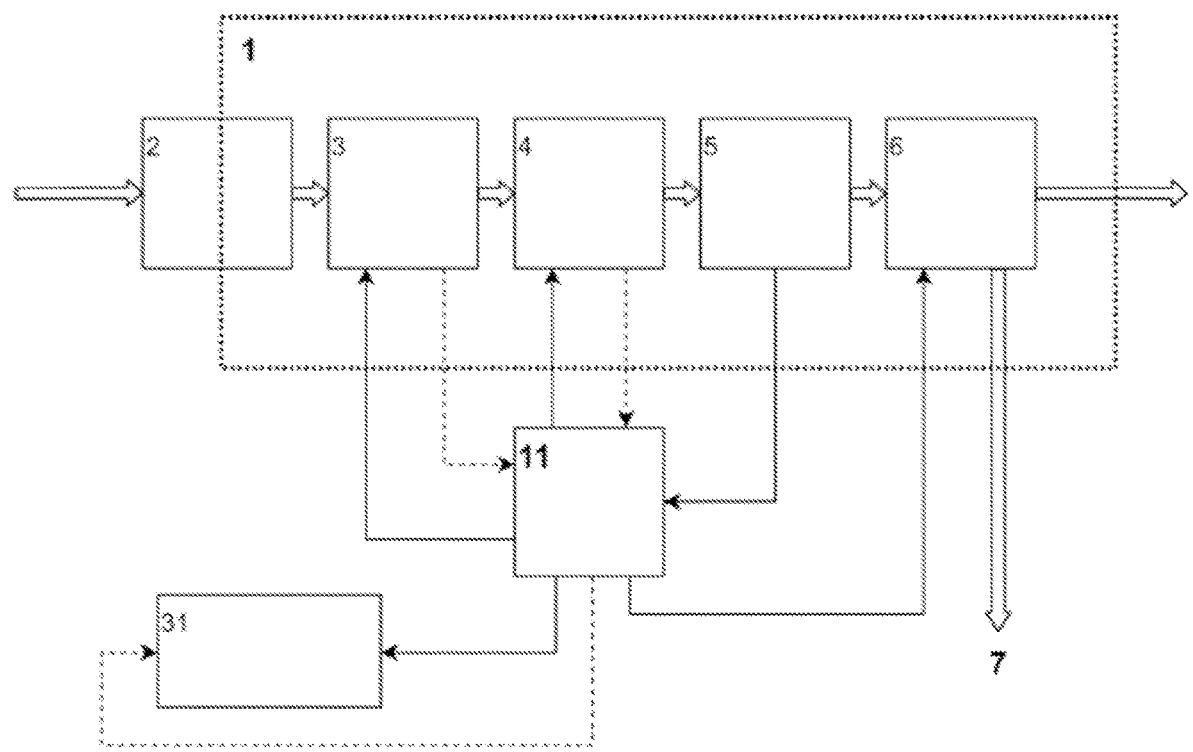
FIG. 15. General arrangement of the hydraulic routing, energy generation and flow measurement electro-mechanic system's components (1) in one of the embodiments of the invention.
Figure 16:
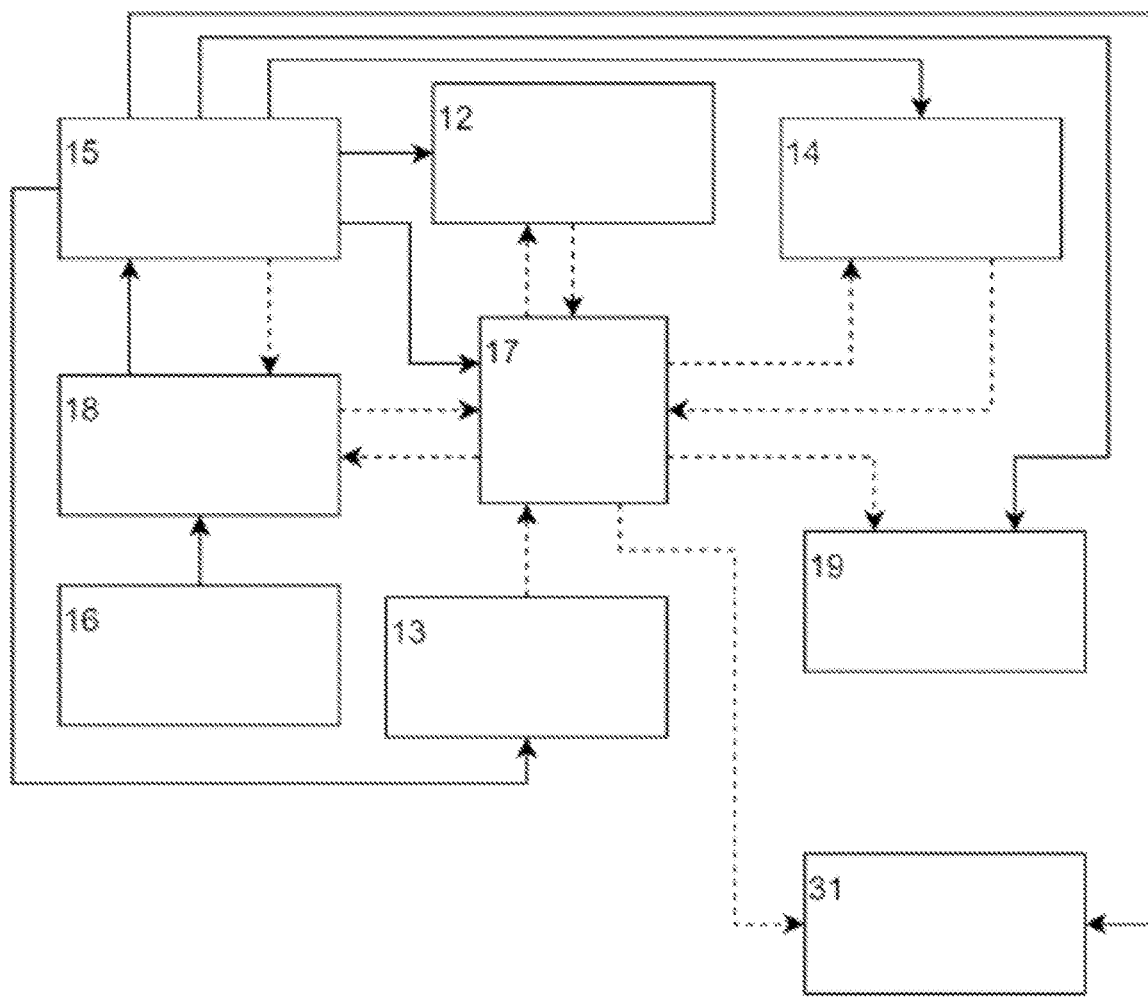
FIG. 16. General configuration of the electronic control interface's components (11) in one of the embodiments of the invention.

In this same particular aspect of the invention, the device includes its own proportional electronic valves (31) which control cold and hot water flow, automatically, and connect with the micro-controller (17). (FIG. 15-FIG. 16).

Figure 17:
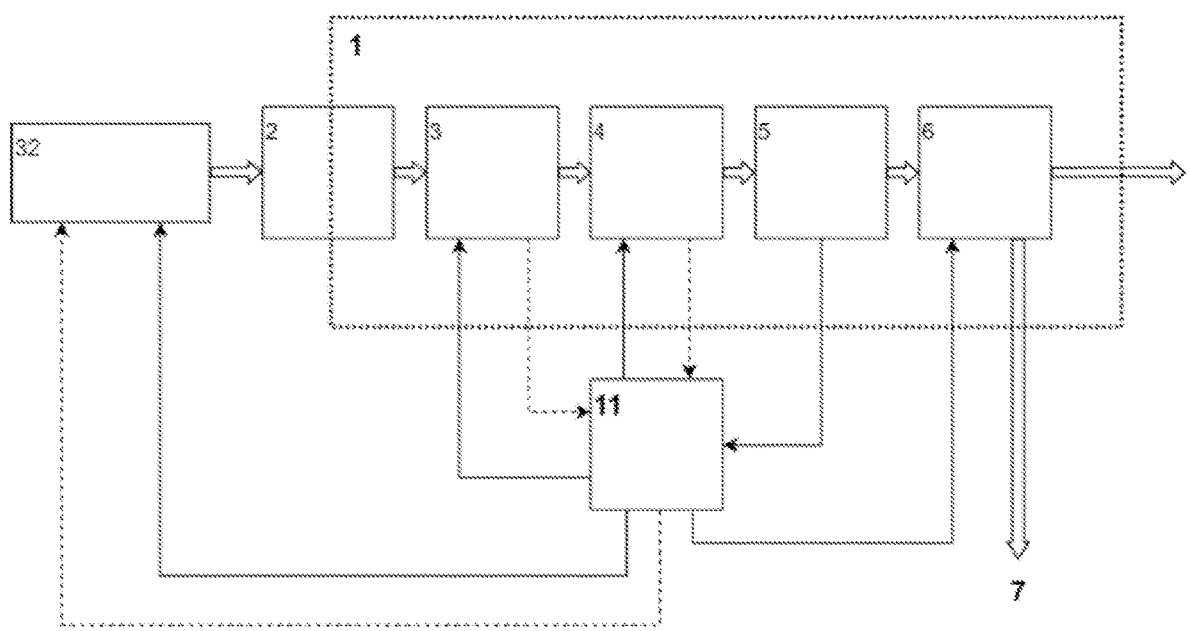
FIG. 17. General configuration of the hydraulic routing, energy generation and flow measurement electro-mechanic system's components (1) in one of the embodiments of the invention.
Figure 18:
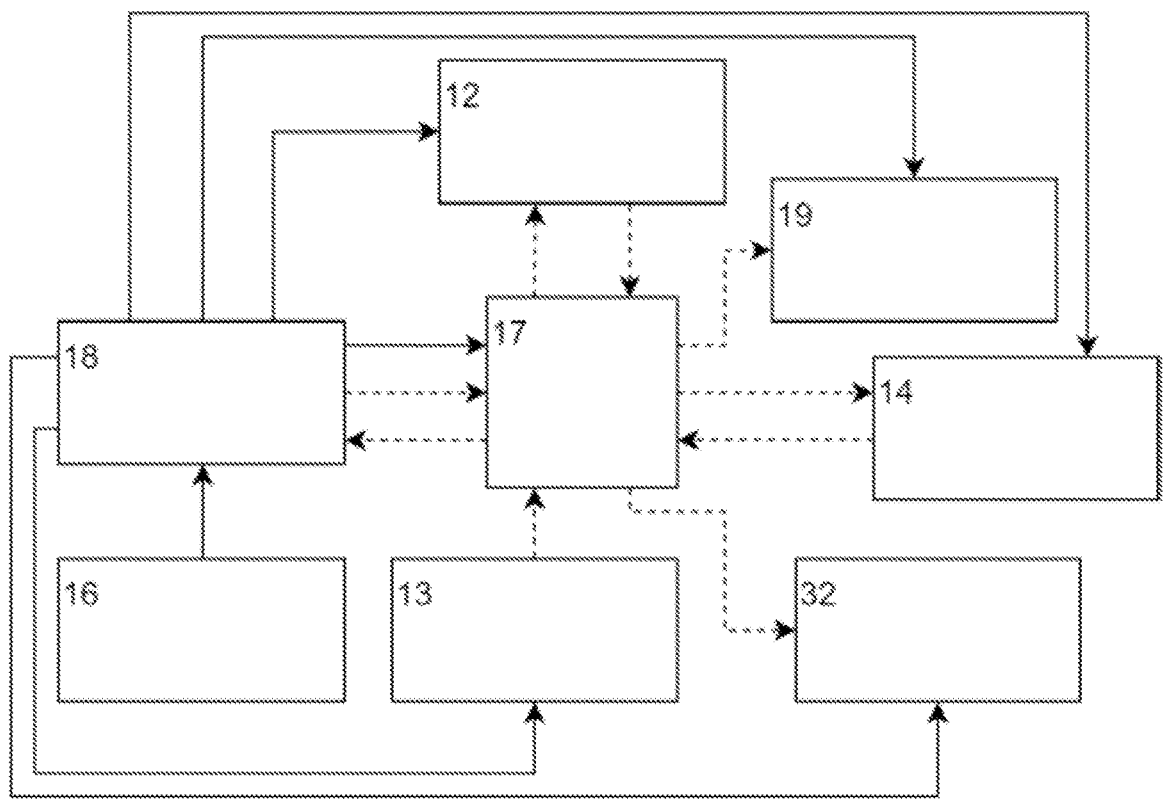
FIG. 18. General configuration of the electronic control interface's components (11) in one of the embodiments of the invention.

The device may also include a water pump (32) located before the entrance of water to the hydraulic routing, energy generation and flow measurement electro-mechanic system (1), which allows the increase in water pressure, and communicates with the micro-controller (17). (FIG. 17-FIG. 18).

Figure 19:
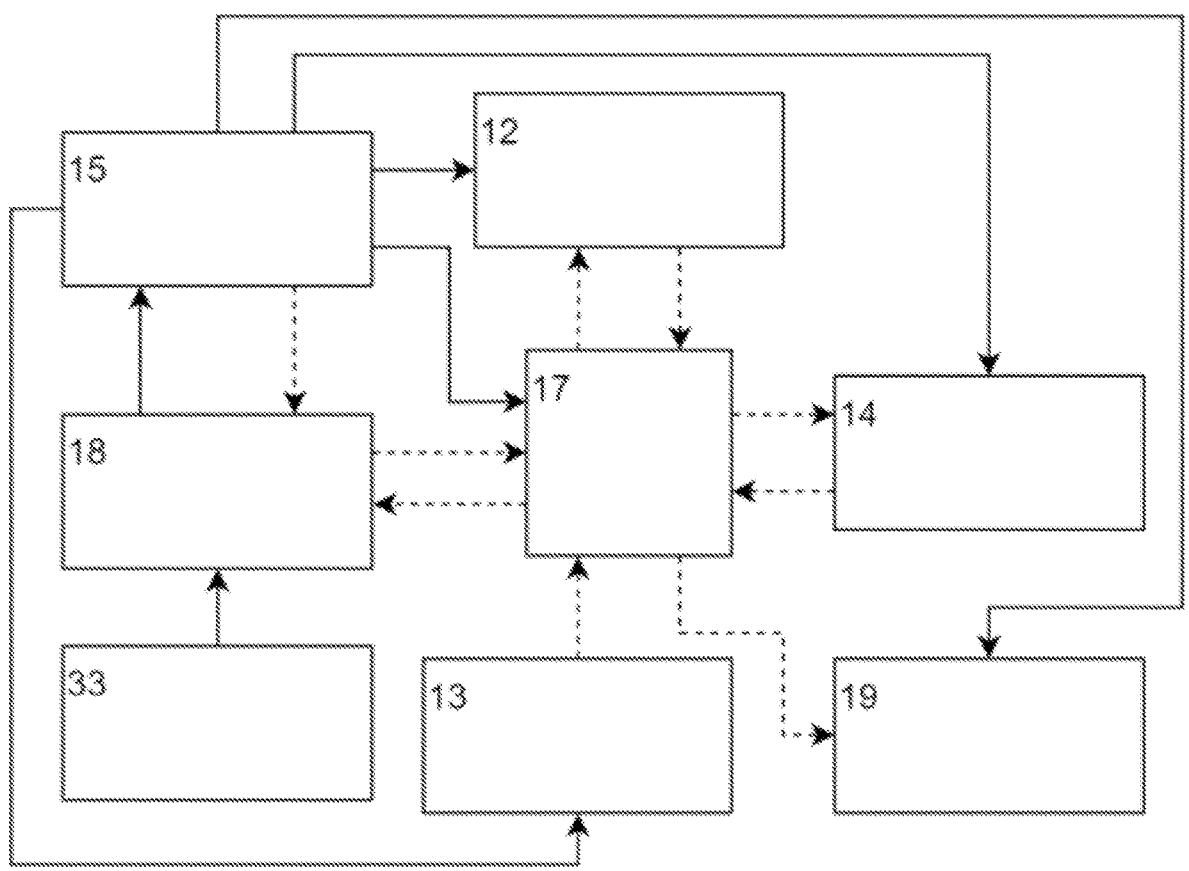
FIG. 19. General configuration of the electronic control interface's components (11) in one of the embodiments of the invention.
Figure 20:
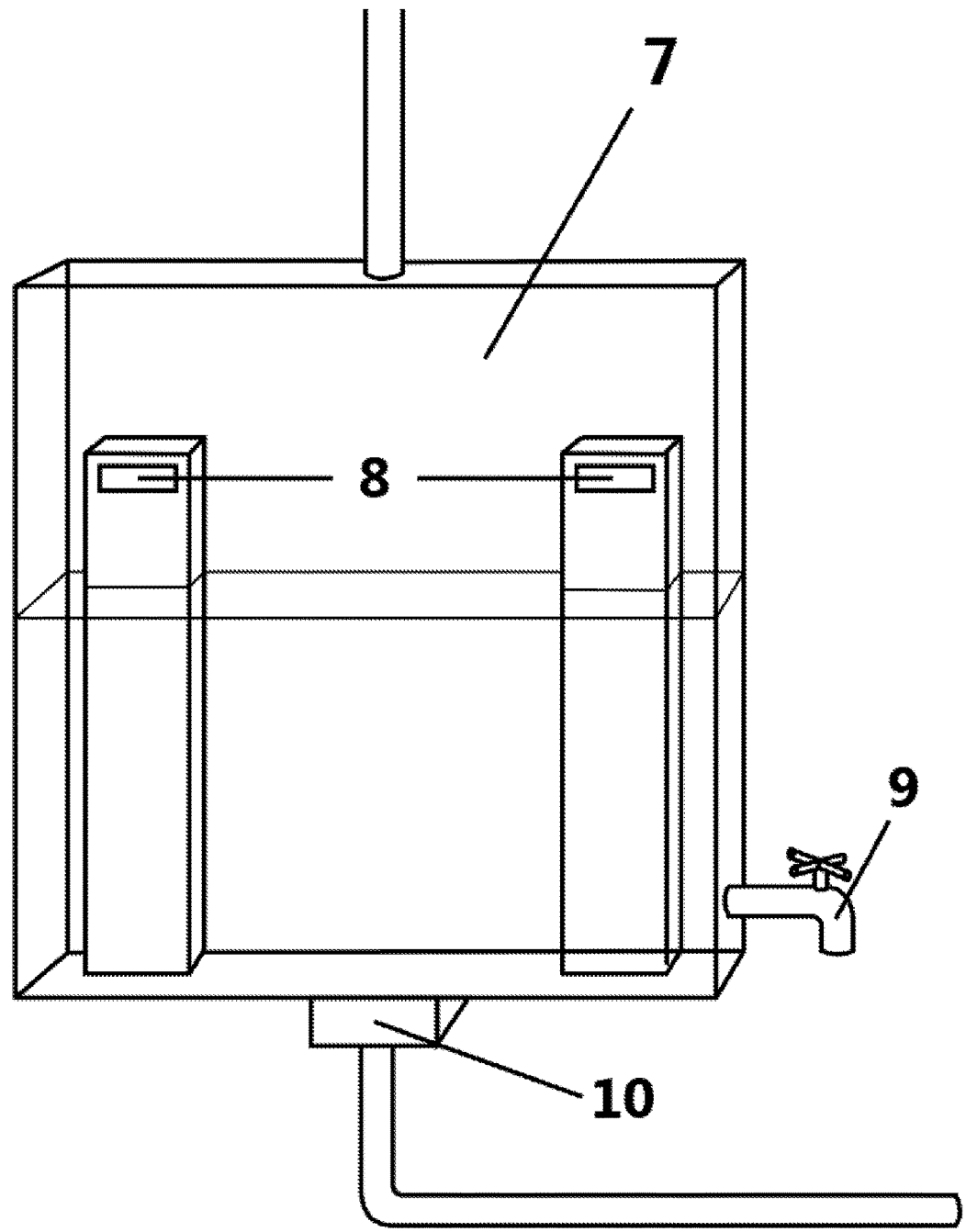
FIG. 20. Components of storage tank (7).
Figure 21:
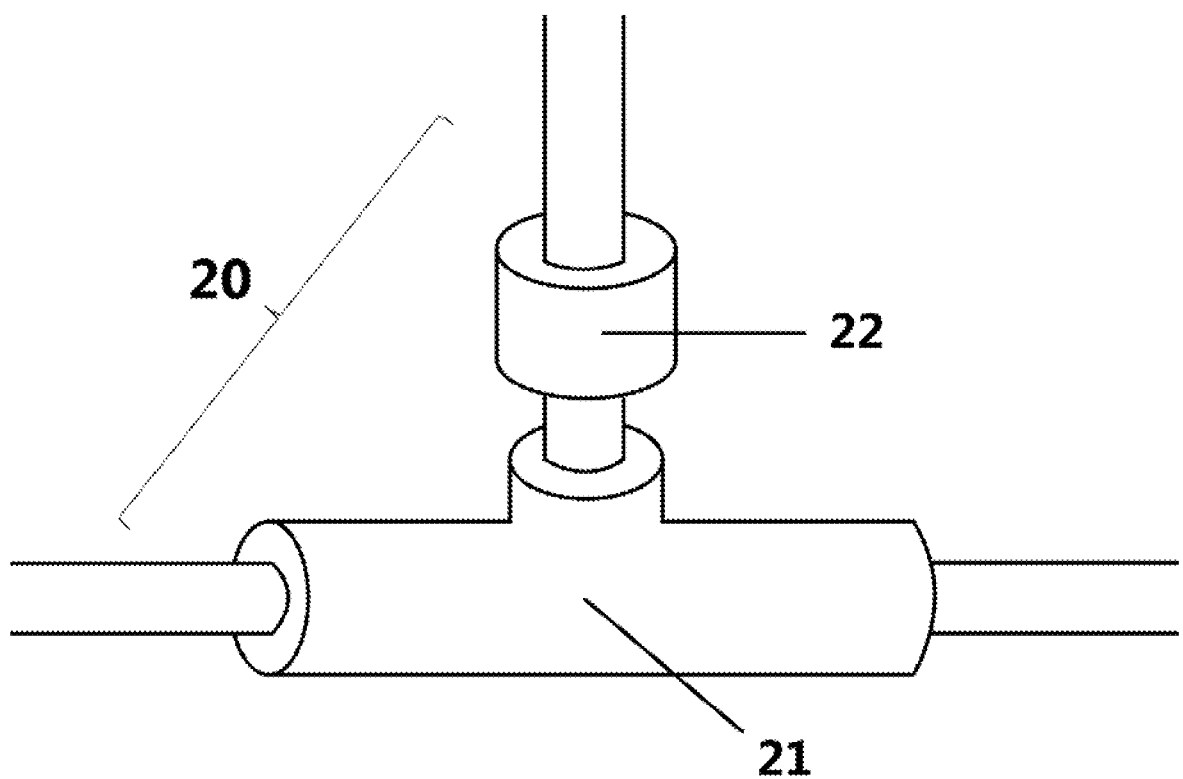
FIG. 21. Autonomous water reuse system (20), Venturi tube (21) and unidirectional or backflow valve (22).
Figure 22:
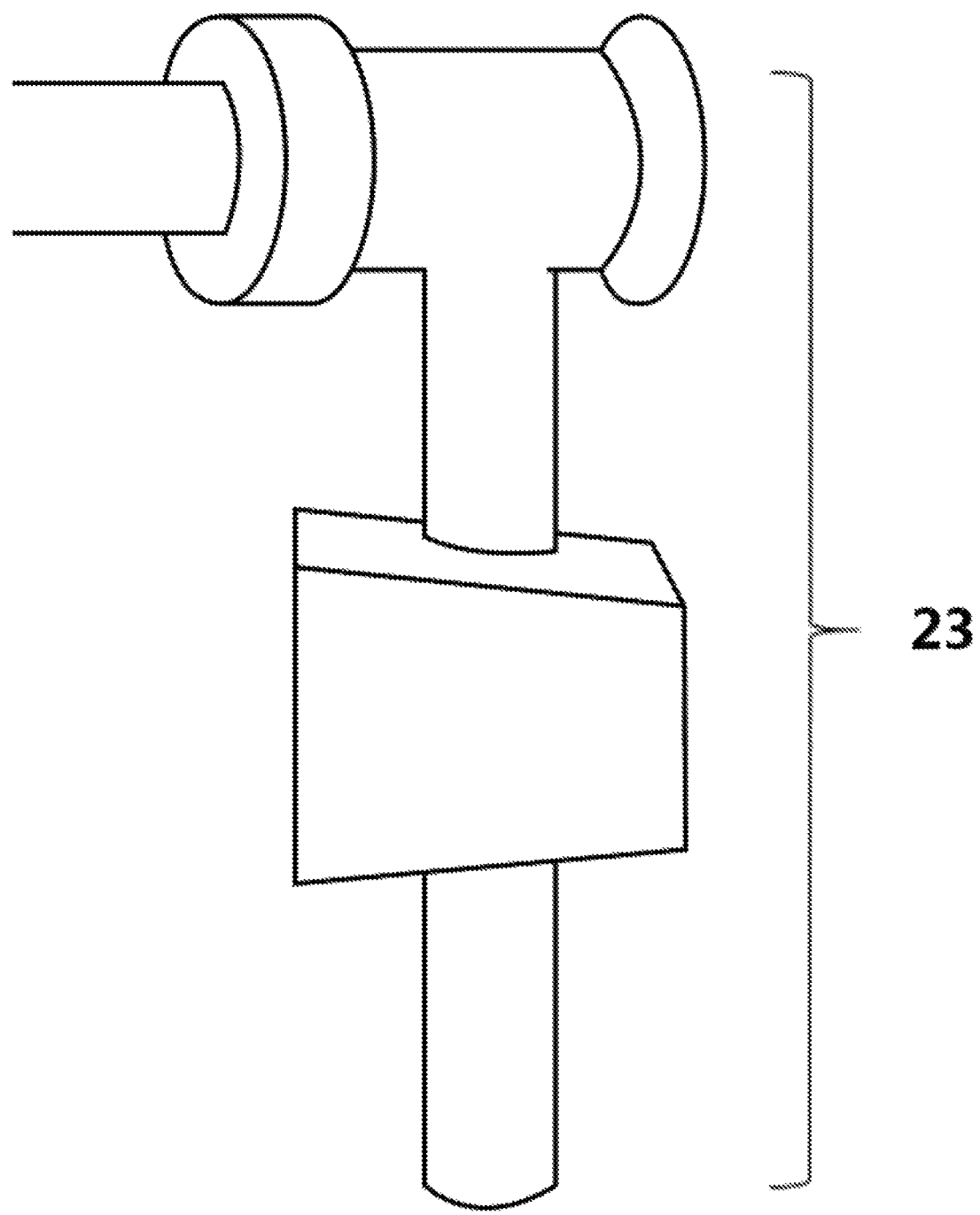
FIG. 22. Autonomous water reuse system (20). Lateral entry level valve (23).

Likewise, the device replaces the AC/DC converter by a solar power feeding block (33), in order to supply the system's energetic requirements and recharge the battery (15). It connects with the charge/use controller (18). (FIG. 19).

In these aspects of the invention, one or several combinations of the previous embodiments are included.

Preferred Embodiments

In a preferred embodiment of the invention, the device comprises a hydraulic routing, energy generation and flow measurement electro-mechanic system (1), which is composed of a three-way electronic valve (6) horizontally or vertically connected to the hydraulic micro generator (5), a temperature sensor (4), a flowmeter (3) and a removable filter (2) at the entrance of the system.

According to this same aspect of the invention, the device comprises a single water storage tank (7) which can be internal, external or recessed in the wall. This tank comprises one or two overflow reliefs (8), between 0 and at least one mechanical shut-off valve (9), and one removable filter (10) located at the water exit in the lower part of the tank.

Particularly, in this same aspect or embodiment of the invention, water is stored in a series of between 2 and 5 modular tanks (7). These comprise between 1 to 5 overflow reliefs (8), between 0 and 5 mechanical shut-off valves (9), between 0 and at least 1 unidirectional or backflow valve (22) and at least one removable filter (10).

In the same embodiment, the device of the invention comprises an electronic control interface (11) which comprises a screen (12), a set of buttons and/or switches and/or encoders for turning the system on and off, controlling water temperature and water routing (13), a wireless connection module (14), a rechargeable battery (15), an AC/DC converter (16), a micro-controller (17), a charge/use controller (18) and an auditory or visual indicator (19).

In this same preferred embodiment of the invention, the device comprises an autonomous stored water reuse system (20), which reintroduces the water autonomously into the housing's water supply network. It is composed of a Venturi tube (21) and between 0 and at least one unidirectional or backflow valve (22).

According to the same embodiment of the invention, the autonomous stored water reuse system (20) reintroduces water autonomously into the toilet's water tank. It comprises of a lateral entry level valve (23), which connects directly to the toilet tank.

Particularly, in another preferred aspect of the invention, a series of 2 or more showers, each one with a hydraulic routing, energy generation and flow measurement electromechanic system (1) and an electronic control interface (11), wherein the water saved from the 2 or more showers is stored in a single central tank (24) with a single autonomous stored water reuse system (20), a Venturi tube (21) and between 0 and at least one unidirectional or backflow valve (22).

In this same preferred embodiment, a series of 2 or more showers comprise a single autonomous stored water reuse system (20), with a lateral entry level valve (23).

In these aspects of the invention, one or several combinations of the previous embodiments are included.

Examples

Device of the Invention Application and Operation Test
Tests for Measuring Water Consumption and Possible Impact of the System:

The average water flow from the showerheads commonly used in the city was measured with the use of Hall effect flow sensors.

The average time of hot water to come out of the showerheads was measured; for this, electrical and gas-based water heaters and different lengths of piping were tested.

With this information, the water volume that could be saved per shower, in case of implementing the system, was measured.

Tests to Evaluate the Hydraulic Routing Electro-Mechanic System:

The precision of the temperature sensor was evaluated in a 1.27 cm diameter pipe using different water flows and pressure conditions.

The three-way electronic valve's (6) response time was evaluated based on commands from the microcontroller.

The three-way electronic valve's (6) functioning was evaluated under low pressure conditions (worst case scenario) and high-pressure conditions (best case scenario).

The screen's operation and real time transmission of data regarding water temperature, water consumption and shower duration, were evaluated.

Tests to Evaluate the Operation of the Energy Generation System:

The efficiency of a variety of hydraulic micro-generators was evaluated, 0 to 80 volts, and their respective rechargeable batteries and regulators.

The possibility of using energy from the micro-generators to directly supply the system's components, without the need to go through the rechargeable battery, so as to minimize power losses, was assessed.

Test to Evaluate Venturi Tubes' Efficiency as a Stored Water Reuse System into the Household's Water Supply Network.

The efficiency for water reuse of 1.27 cm and 1.905 cm inlet diameter Venturi tubes was evaluated in a water storage tank. This variable was tested for levels between <1 and 15 liters of water inside the tank, and for a variety of pressure conditions in water supply networks.

Test to Evaluate Lateral Entry Level Valves' Efficiency as a Stored Water Reuse System into the Household's Water Supply Networks:

Several tests were conducted with different valves found commonly in the market, under different pressure conditions in the household's water supply network.

Test with Wireless Connection Module:

The possibility to transmit relevant information about water consumption through the internet was evaluated. The development of a mobile app to store relevant information about the user's water consumption was assessed.

Test to Evaluate the Integrated Operation of the Device of the Invention.

A prototype that unifies the elements of the present invention was developed, and its proper independent operation was verified. The prototype allows users to achieve water saving in showers, as described in the present invention, in a satisfactory way.

The invention claimed is:

1. An automated shower water saving device comprising:
a hydraulic routing, energy generation and flow measurement electro-mechanic integrated system (1) controlled by an electronic control interface with wireless internet connection (11), and connected to a modular water storage system (7) that conducts clean saved water by gravity to an autonomous water reuse system (20), wherein
the hydraulic routing, energy generation and flow measurement electro-mechanic integrated system (1) generates energy for a partial self-supply of the device's energetic requirements, filters particles in a water flow, measures water consumption, water savings, and water temperature in a shower, and directs the filtered water flow to a user's shower head or the modular water storage system (7), or both simultaneously;
the electronic control interface with wireless internet connection (11) controls the hydraulic routing, energy generation and flow measurement electro-mechanic integrated system (1) directly or remotely;
the modular water storage system (7) stores water saved by users of one or more showers and conducts it, by gravity, to the autonomous water reuse system (20); and
the autonomous water reuse system (20) connects directly to a toilet or an external tank or a water supply network.

2. The automated shower water saving device of claim 1, wherein the hydraulic routing, energy generation and flow measurement electro-mechanic integrated system (1) includes a removable filter (2), flowmeter (3), and a temperature sensor (4) positioned before a three-way electronic valve (6) that is positioned horizontally or vertically in connection with a hydraulic micro generator (5) to generate energy when water is directed to the user's shower head, or the modular water storage system (7), or both simultaneously, or to generate energy when water is directed exclusively to the modular water storage system (7).

3. The automated shower water saving device of claim 1, wherein the modular water storage system (7) includes between 1 and 5 modular storage tanks connected in series that stores saved water from a single shower or a central tank that stores saved water from two or more showers, and which can be installed internally, externally, or recessed in housing walls, and include between one to five overflow reliefs (8), between zero and five mechanical shut-off valves (9), at least one unidirectional or backflow valve (22) and at least one removable filter (10).

4. The automated shower water saving device of claim 1, wherein the electronic control interface with wireless internet connection (11) presents information about shower time, water temperature, water consumption, and water savings in real time, provides remote control of the device, and includes a screen or display (12); a power button or switch or encoder; a combination of buttons, switches, and encoders for water temperature and routing control (13); a wireless connection module (14); a rechargeable battery (15) or an AC/DC converter (16) or both; a micro-controller (17); and a charge/use controller (18).

5. The automated shower water saving device from claim 1, wherein the autonomous water reuse system (20) includes a lateral entry level valve (23) that reintroduces water to a toilet or an external tank or a venturi tube (21) and at least one unidirectional or backflow valve (22) that reintroduce water to any point of a housing water supply network.

* * * * *